US 6,620,547 B1

(12) United States Patent
Sung et al.

(10) Patent No.: US 6,620,547 B1
(45) Date of Patent: Sep. 16, 2003

(54) CATHODE INCLUDING TRANSITION METAL/MATRIX POLYMER COMPOSITION AND A SECONDARY POLYMER BATTERY THEREFROM

(75) Inventors: Hyun Kyung Sung, Taejeon (KR); Kwanyoung Lee, Taejeon (KR); Hyun Jung Kim, Kimhae (KR)

(73) Assignee: Korea Kumho Petrochemical Co., Ltd., Seoul (KR)

( * ) Notice: Subject to any disclaimer, the term of this patent is extended or adjusted under 35 U.S.C. 154(b) by 0 days.

(21) Appl. No.: 09/390,635

(22) Filed: Sep. 7, 1999

(30) Foreign Application Priority Data

Sep. 16, 1998 (KR) .............................. 98-38305

(51) Int. Cl.⁷ ........................... H01M 4/60; H01M 4/48
(52) U.S. Cl. .................. 429/212; 429/213; 429/221; 429/223; 429/224; 429/229; 429/231.5
(58) Field of Search ................... 429/212, 213, 429/221, 223, 224, 229, 231.5

(56) References Cited

U.S. PATENT DOCUMENTS

| 3,956,194 A | * | 5/1976 | Armand ........................ 252/507 |
| 4,288,506 A | | 9/1981 | Coetzer et al. |
| 4,546,055 A | | 10/1985 | Coetzer et al. |
| 4,620,026 A | | 10/1986 | Siegel |
| 4,654,390 A | | 3/1987 | Siegel |
| 4,714,665 A | * | 12/1987 | Siegel et al. |
| 4,728,588 A | * | 3/1988 | Noding et al. ............... 429/127 |
| 4,795,685 A | | 1/1989 | Bones et al. |
| 4,797,333 A | | 1/1989 | Coetzer et al. |
| 4,810,599 A | * | 3/1989 | Kondo et al. ................ 429/191 |
| 4,992,345 A | | 2/1991 | Meintjes et al. |
| 5,108,855 A | * | 4/1992 | Daifuku et al. .............. 429/191 |
| 5,283,135 A | | 2/1994 | Redey et al. |
| 5,573,873 A | | 11/1996 | Bugga et al. |
| 5,589,297 A | * | 12/1996 | Koga et al. .................. 429/212 |
| 5,686,203 A | * | 11/1997 | Idota et al. |
| 6,165,641 A | * | 12/2000 | Striebel et al. .............. 429/212 |

OTHER PUBLICATIONS

Linden, David. Handbook of Batteries, 2nd Ed., pps. 36.20–36.22, 1995.*
Table C.1 Electrochemical Equivalents of Battery Materials, p. C–3 No Date.

* cited by examiner

Primary Examiner—Patrick Ryan
Assistant Examiner—Tracy Dove
(74) Attorney, Agent, or Firm—Birch, Stewart, Kolasch & Birch, LLP

(57) ABSTRACT

A secondary polymer battery is provided with:
  a) a cathode containing a current collector made of an electrically conductive substrate and a composition placed on said current collector, said composition including i) one or more transition metal compounds selected among a transition metal and transition metal salt of the formula $MX_n$, wherein M is a transition metal, X is a halogen negative ion, and n is an integral number between 1 to 6; ii) a matrix polymer which has a basic functional group with affinity for the transition metal species;
  (b) a polymer electrolyte containing a lithium salt; and
  (c) an anode including the material selected among a lithium metal, a lithium alloy and a lithium intercalation material such as carbon. The secondary polymer battery has a high energy density and a high charging/discharging efficiency with extended cycle life.

12 Claims, 5 Drawing Sheets

CATHODE INCLUDING TRANSITION METAL/MATRIX POLYMER COMPOSITION AND A SECONDARY POLYMER BATTERY THEREFROM

BACKGROUND OF THE INVENTION

1. Field of the Invention

The present invention relates to a reversible electrode containing an active transition metal and a matrix polymer with a basic functional group, which has affinity to the transition metal species. This invention also relates to a secondary polymer battery containing said electrode as a positive electrode (hereinafter referred to as a "cathode") with high energy density and good reversibility.

2. Discussion of Related Art

A battery is one of the essential components of electronic equipment widely used in modern life. Especially, the development of electronic communication and the computer brought a rapid and wide distribution of portable devices. And the secondary battery that is repeatedly usable by recharge is highly demanded as an energy source of the portable apparatus. Therefore, these kinds of small secondary batteries need to be small volume, light-weight, and longer lasting upon repeated cycle of charge and discharge, to be suitable for hand-carrying applications. In order to meet these requirements, electrode material with high energy density should be provided.

There have been much research efforts to utilize high energy density of transition metal as a cathode active material in a secondary battery. For example, U.S. Pat. Nos. 4,546,055, 4,795,685, 4,992,345, 4,288,506 and 4,797,333 describe a secondary battery comprising an alkali metal anode, a molten sodium aluminum halide ($NaAlX_n$) electrolyte, a solid electrolyte separator such as β-alumina, and a cathode, wherein the cathode active material is a halide of a transition metal, such as Fe, Ni, Co, and Cr.

However, there are several disadvantages associated with these batteries, including high operation temperature over 70° C. required to maintain molten state of sodium aluminum halide ($NaAlX_n$) electrolyte and formation of corrosive metal chloride. Formation of an electrically insulating layer by a metal chloride was also pointed out in U.S. Pat. No. 5,283,135. And, the agglomeration of the metal particles causing a short cycle life and addition of the powder of a transition metal, such as Fe, Co and Mn, to nickel halide to prevent agglomeration were described in U.S. Pat. No. 5,573,873.

On a different aspect, as for a small secondary battery comprising a transition metal as the cathode active material, the U.S. Pat. Nos. 4,714,665 and 4,728,588 disclose a secondary battery consisting of three layers of polymer films. In order to increase the content of metal species in the electrode with minimum agglomeration, a large amount of organic plasticizer which dissolves active metal species of the formula $MX_a$, wherein M is Li, Ca, Cu and Zn, and X is Cl, Br, and 1, was added. The U.S. Pat. No. 4,714,665 discloses a secondary battery consisting of polymer film electrodes which is light and flexible. Metal salts are dispersed in the same composition of polymer matrix and plasticizer as polymer electrolyte layer to provide high compatibility between electrode and electrolyte layers. And, the U.S. Pat. No. 4,728,588 discloses a secondary battery consisting of a single polymer sheet which contains a metal salt as the electrode active material, polymer matrix and plasticizer.

The content of the metal salt in the electrode prepared in this manner highly depends upon the content of the plasticizer. However, the content of the plasticizer changes due to the volatility and is limited to the minimum fluidity required to maintain the physical shape of the electrode. Even though the concentration of metal species was suggested to be 5 to 30%, the capacity of the electrode that is directly derived from the content of active metal species is limited by the amount of plasticizer in the electrode. In the U.S. Pat. Nos. 4,620,026 and 4,654,390, the use of an ester compound as a plasticizer is described, and this ester compound has low volatility and a good low-temperature characteristic.

As mentioned above, there are many problematic aspects in using a transition metal as a cathode active material for a secondary battery.

SUMMARY OF THE INVENTION

The present invention is directed to a cathode material composition with a high capacity that substantially obviates one or more of the aforementioned problems of said prior arts which use the transition metal compound as the cathode active material.

It is therefore an object of the present invention to provide a cathode composition including one or more transition metal compounds selected among transition metal or a transition metal salt and a matrix polymer which has a basic functional group with an affinity for the transition metal species.

It is another object of the present invention to provide a cathode composition, wherein a high content of transition metal compound is homogeneously dispersed in a matrix polymer which has a basic functional group with an affinity for the transition metal species.

It is still another object of the invention to provide a cathode including a transition metal/matrix polymer composition, which has a high capacity and a high charging/discharging efficiency upon repeated cycles of charge and discharge.

It is a further object of the invention to provide a secondary polymer battery of the all-solid type, which does not impose any problem relating to usage of a liquid component and has a flexibility in the design of the battery, such as mini-cell or thin-cell according to the various applications.

Additional features and advantages of the present invention will be set forth in the description that follows, and in part will be apparent from the description, or may be learned by practice of the invention.

The objectives and other advantages of the present invention will be realized and attained by the structure of the invention particularly pointed out in the written description and claims hereof as well as the appended drawings.

In order to achieve these and other advantages and in accordance with the purpose of the present invention, as embodied and broadly described, a polymer secondary battery of the present invention comprises (a) a cathode prepared by casting on an electrically conductive collector with a high capacity cathode active material composition including i) one or more transition metal compounds selected among transition metal and transition metal salt of the formula $MX_n$, wherein M is a transition metal, X is a halogen negative ion, sulfur atom or conjugate ion of acid, and n is an integral number between 1 to 6; ii) a matrix polymer which has a basic functional group with affinity for the transition metal species;

(b) a polymer electrolyte containing a lithium salt; and (c) an anode including the material selected among a lithium metal, a lithium alloy, and a lithium intercalation material such as carbon.

It is to be understood that both the foregoing general description and the following detailed description are exemplary and explanatory and are intended to provide further explanation of the present invention as claimed.

BRIEF DESCRIPTION OF THE ATTACHED DRAWINGS

The accompanying drawings, which are included to provide a further understanding of the present invention and are incorporated in and constitute a part of this specification, illustrate embodiments of the present invention and together with the description serve to explain the principles of the present invention.

DETAILED DESCRIPTION OF PREFERRED EMBODIMENT

Figure 1:
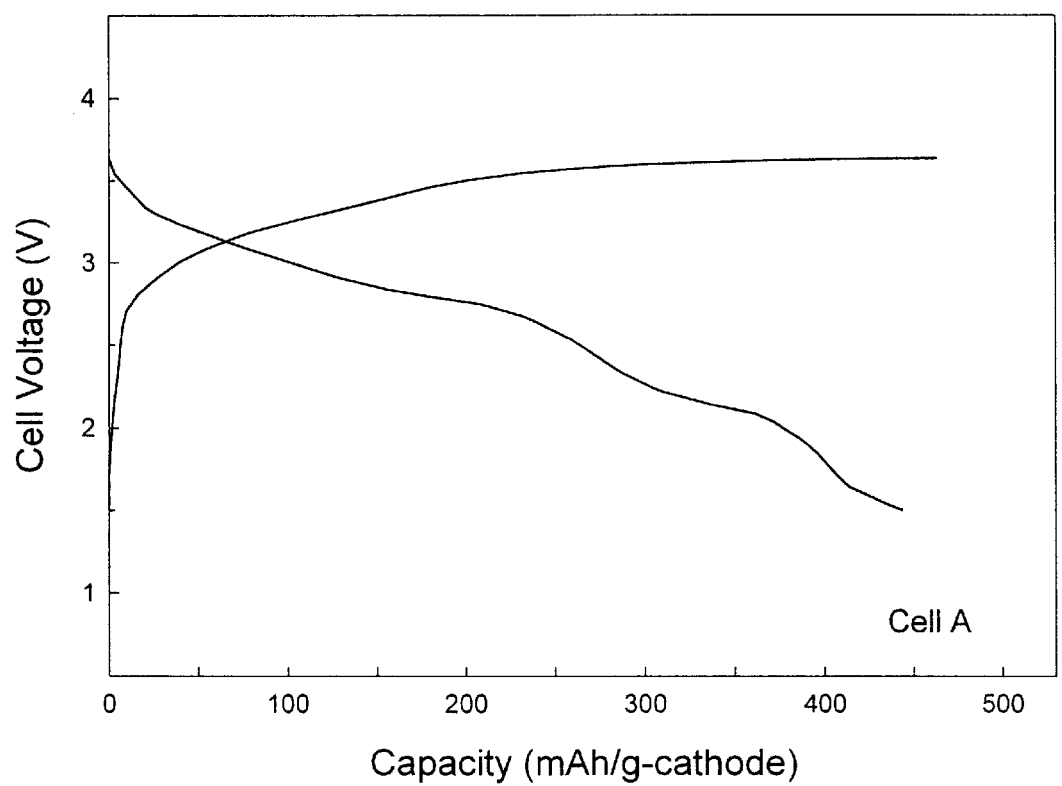
FIG. 1 shows charge and discharge profiles of a cell A containing a cathode including $FeCl_2$/poly(vinyl pyrrolidone) composition prepared in Example 2.

Reference will now be made in detail to the preferred embodiments of the present invention, examples of which are illustrated in the accompanying drawings.

The present invention provides a polymer secondary battery comprising:

(a) a cathode prepared by casting on an electrically conductive collector with a high capacity cathode active material composition including i) one or more transition metal compounds selected among a transition metal and a transition metal salt of the formula MX, wherein M is a transition metal, X is a halogen negative ion, sulfur atom or conjugate ion of acid, and n is an integral number between 1 to 6; ii) a matrix polymer which has a basic functional group with affinity for the transition metal species;

(b) a polymer electrolyte containing lithium salt; and (c) an anode including the material selected among a lithium metal, a lithium alloy and a lithium intercalation material such as carbon.

The said polymer secondary battery of the present invention has a high capacity and high charging/discharging efficiency in repeated cycles of charge and discharge.

Cathode

The present invention provides a composite cathode with a high capacity and a high charging/discharging efficiency in repeated usage. The composite cathode includes transition metal/matrix polymer composition including one or more transition metal compounds as a cathode active material selected among a transition metal or a transition metal salt, homogeneously dispersed in a matrix polymer which has a basic functional group with affinity for the transition metal species.

The transition metal compound as a cathode active material is selected from the group consisting of a transition metal and a transition metal salt of the formula $MX_n$, wherein M is a transition metal, X is a halogen negative ion, sulfur atom or a conjugate base negative ion of acid, and n is an integral number of 1 to 6.

When the secondary polymer battery is charged, the transition metal species becomes a metal ion by oxidation, and when the secondary polymer battery is discharged, it becomes a metal ion with lower oxidation state or a metal by reduction.

Theoretical capacity of an electrode material increases with the number of electrons included in the oxidation/reduction process. Transition metals generally have a plural number of oxidation states and thus in the case of the oxidation/reduction reaction, a transport of more than one electron takes place. Accordingly, a preferable species of a transition metal compound comprised of the cathode of the present invention is a transition metal with multiple oxidation states, and more particularly, such as Fe, Ni, Cr, Co, V, Zn, Mo and W, and their alloys or their ion salts.

If the oxidation/reduction reaction between metals and their cations is utilized for an electrode reaction, their electrochemical equivalent capacities are as high as 1440 mAh/g for Fe; 913 mAh/g for Ni; 1550 mAh/g for Cr; 976 mAh/g for Mn; 910 mAh/g for Co; 2630 mAh/g for V; 820 mAh/g for Zn; 1670 mAh/g for Mo.(D. Liden Ed., Handbook of Batteries and Fuel Cells, McGraw-Hill, pp. C-3, 1984). This theoretical electrochemical equivalent capacity is far higher than that of a lithium metal oxide compound used as a cathode active material of a conventional lithium ion battery. The present invention realizes the lightness of the secondary battery by comprising the transition metal compounds as a cathode active material.

According to the present invention, the cathode comprises a matrix polymer with a basic functional group which has a chemical affinity to active transition metal species. Even though transition metals have a high equivalent capacity, metal ions generated by oxidation during charging are soluble in organic plasticizer and irreversibly diffuse out from the cathode in conventional battery. Dislocated metal ions do not function as a cathode active material and accumulated loss of metal ions by repeated cycle will result in a decrease of discharging capacity. The cathode of the present invention has a matrix polymer which has a basic functional group with affinity to the transition metal species so that metal ions are attached to the chains of the matrix polymer and diffusional loss of metal species is minimized. In other words, the cathode in present invention is designed to hold metal ions by chemical affinity provided by the matrix polymer.

Moreover, the chemical affinity inherent in the matrix polymer effectively increases the salvation of transition metal species in the cathode of polymer film type. Increased salvation power of the matrix polymer results in higher content of transition metal species in the cathode and consequently, maximum discharge capacity of the cathode. Also the matrix polymer can effectively disperse the transition metal species in the cathode so that the transition metals are not agglomerated each other upon repetition of charge and discharge.

Accordingly, the present invention provides a reversible cathode with high capacity and high charging/discharging efficiency upon repeated cycles of charge and discharge by combining transition metal active material and a matrix polymer which has a basic functional group with affinity for the transition metal species.

For the preferable basic functional group with affinity for the transition metal species, there are halogen, nitrile, carboalkoxy, carbohydroxy, pyrrolidonyl and pyridinyl functional groups. Examples of the matrix polymer with the basic functional group include polyacrylate, poly(acrylic acid), poly(methyl methacrylate), poly(vinyl pyrrolidone), polyacrylonitrile, poly(vinylidene fluoride), poly(vinyl chloride), their copolymer, and their blend.

Furthermore, the matrix polymer of the present invention includes a polymer which has an ether, sulfide and sulfone linkage in a repeated unit. Examples of the preferable matrix polymer with basic functional group include polyethylene oxide, polypropylene oxide, polyethylene imine, polyphenylene sulfide, polysulfone resin, their copolymer, and mixtures thereof.

In addition, the matrix polymer with the basic functional group includes an electrically conductive polymer that has nitrogen, oxygen or sulfur atom in the monomeric unit of the polymer. The conductive polymers provide additional advantage in increasing conductivity of the cathode. Moreover, since the transition metal species in the cathode is bound to a conductive polymer, electron transport from and to the transition metal species is facilitated. Examples of the preferable conductive polymer with the above-mentioned characteristics include polyaniline, polypyrrole and polythiophene.

A preferable content of the matrix polymer is in the range of 5 to 60 wt. % of total constituents in the cathode.

In the present invention, the transition metal species as a cathode active material can be used as neutral metal, its ion salt and its alloy with other metals. Accordingly, the transition metal species of the present invention is used by dissolving or dispersing metal species into the electrode mixture. In the case of a transition metallic powder dispersed in the cathode composition, it is preferable that a particle size of the metal powder is below 10 $\mu$m, and a surface of the metal powder can be oxidized with a diluted weak acid such as acetic acid. A preferable content of the transition metal species is in the range of 5 to 95 wt. % of total constituents in the cathode.

In order to prepare the cathode for the battery of the present invention, the electrically conductive material, ion-conducing polymer binder, or organic solvent can be added when needed.

The electrically conductive material includes a conductive carbon material or an electrically conductive polymer. Examples of the preferable conductive carbon material in the electrode according to the present invention include graphite and acetylene black. The preferable content of the conductive material is in the range of 5 to 150 wt. % with respect to the transition metal compounds in the cathode composition.

Examples of the binder material include poly(vinylidene fluoride), EPDM, and styrenebutadiene rubber(SBR).

Organic solvent can be used in fabricating the cathode material in the form of a paste, and this solvent may depend upon the solubility of the cathode composition, but in general, aprotic solvent is used therefor. Examples of the organic solvent usable for the purpose include the organic solvents such as N-methyl-2-pyrrolidinone, propylene carbonate or ethylene carbonate.

The thus-fabricated cathode material mixture is homogenized to enhance its dispersion by using a proper method such as self-agitation, mechanic agitation, ultrasound agitation or ball milling.

The cathode mixture is applied on a current collector. For coating, various coating methods such as simple painting, spin coating, bar coating or doctor-balding can be used. The current collector is made of an electrically conductive substrate such as Cu, Al, Ni, SUS or graphite and used in the form of thin film, sheet, gauze or mesh according to the cell design.

A method of fabricating the cathode of the present invention includes the following steps:

(1) In the first step, the matrix polymer which has the basic functional group with affinity for the transition metal species and the binder material are dissolved in aprotic solvent such as Nmethyl-2-pyrrolidinone.

(2) In the second step, one or more transition metal compounds of the present invention are added to the solution.

(3) In the third step, a conductive material is added thereto and completely mixed.

(4) In the fourth step, the mixture is applied on a current collector, and the coated slip is dried under vacuum and then pressed.

Polymer Electrolyte

A polymer electrolyte in the secondary polymer battery of the present invention is an ionconducting polymer electrolyte containing a polymer, a lithium salt of the formula LiY (Y is the conjugate base negative ion of acid) and plasticizer such as an organic solvent which can dissolve a polymer and a lithium salt.

The polymer material for the polymer electrolyte includes polyethylene oxide, polypropylene oxide, poly(acrylonitrile-co-methyl acrylate), poly(vinylidene fluoride), and poly(vinylidene fluoride-co-hexafluoropropylene), each of them having a heteroatom such as oxygen, nitrogen in the monomeric unit, or halide substituents, to thereby have a chemical interaction with the lithium ion.

Examples of the lithium salts for the polymer electrolyte include $LiBF_4$, $LiPF_6$, $LiClO_4$, $LiAsF_6$, $LiAsCl_6$, $LiSbCl_6$, $LiSbF_6$, $LiCF_3SO_3$, and $LiN(SO_2CH_3)_2$. The preferable content of the lithium salt contained in the polymer electrolyte is in the range of 5 to 50 mol % relative to lithium per monomer unit of the polymer (Li+/monomer).

The organic solvent can be added to the polymer electrolyte as a plasticizer. Desirable organic solvent has a carbonate structure. Examples of the plasticizer include propylene carbonate, ethylene carbonate, dimethyl carbonate, diethyl carbonate, ethyl methyl carbonate, and a mixture of more than two. The preferable content of the plasticizer is in the range of 20 to 90 wt. % relative to the total polymer electrolyte.

Anode

An anode in the secondary polymer battery of the present invention includes a lithium metal or a lithium alloy. Also, a lithium intercalation material such as carbon or graphite can be used. When the secondary battery is charged, in the case of the lithium metal anode, the lithium ion supplied from the electrolyte is reduced to thereby form lithium metal. When the battery is discharged, the lithium ion is generated by the oxidation of the anode. In the case of the carbon anode, intercalation and de-intercalation of the lithium ion occur, respectively.

The secondary polymer battery of the present invention is made in solid form so that the battery does not necessarily need a hard case or extra equipment to prevent problems arisen by the use of a liquid component. The secondary battery of the present invention is simply packed and thus light. Additionally, it is easily adaptable to any portable electronics because it can be made in various shapes according to its application purpose.

The present invention is now determined to be useful for the lithium secondary battery, however, it is not limited only to the specific electric cell and also can be adaptable to the primary battery.

EXAMPLE

Hereinafter, the present invention will be described as follows according to its preferred embodiment. But, the present invention is not confined to the embodiment.

EXAMPLE 1

Preparation of Polymer Electrolyte $LiBF_4$ (Merck) 2.30 g was dissolved in 18.48 of a mixed solvent from propylene carbonate (Mitsubishi Chemical Co.) and ethylene carbonate (Mitsubishi Chemical Co.) (1.33:1.00 in wt.). Poly(acrylonitrile-co-methyl acrylate) (acrylonitrile:methyl acrylate=94:6, Polysciences) 3.00 g was added to the solution and the mixture was stirred at 120~140° C. The resultant viscous and homogeneous solution was cast on a glass plate and dried at 80° C. The prepared polymer electrolyte has an ion conductivity of $10^{-3}$ to $10^{-4}$ S/cm by an impedance measurement. All the preparation was carried out in a dry box under an argon atmosphere.

EXAMPLE 2

Poly(vinyl pyrrolidone) (Aldrich) 0.6 g, poly(vinylidene fluoride) (Mw=534,000, Aldrich) 0.40 g, and Iron(II) chloride ($FeCl_2$, Aldrich) 2.50 g were dissolved in N-methyl-2-pyrrolidinone (Mitsubishi Chemical Co.). And then, acetylene black (Chevron) 0.60 g was added to the solution and the mixture was stirred for two days. The resulted slurry was cast on copper foil as current collector, and the coated slip was dried under vacuum for 16 h at 60 to 80° C., then pressed. The content of cathode active material $FeCl_2$ to the whole cathode composition is 61.0 wt. % and that of poly(vinyl pyrrolidone) is 14.6 wt. %.

The test cell (cell A) has a multi-layered configuration as a polymer electrolyte film was sandwiched with metallic lithium foil layered on Ni mesh current collector and the cathode sheet. Assembly of the test cell was carried out in a dry box under an argon atmosphere.

EXAMPLE 3

The test cell B was prepared in the same manner as in Example 2 except that polyaniline (Versicon, Allide Signal Corp.) was used instead of poly(vinyl pyrrolidone) in the cathode composition of Example 2. The content of the cathode active material FeC12 to the whole cathode composition is 61.0 wt. %, and that of polyaniline is 14.6 wt. %.

EXAMPLE 4

The test cell C was prepared in the same manner as in Example 2 except that Zinc(II) Chloride, ($ZnCl_2$, Aldrich) is used instead of $FeCl_2$ in the cathode composition of Example 2. The content of the cathode active material $ZnCl_2$ to the whole cathode composition is 61.0 wt. %, and that of poly(vinyl pyrrolidone) is 14.6 wt. %.

Evaluation of the Performance of the Cathode

Each of the cells A, B and C assembled in the Examples 2 to 4 was connected to leads from a cycler (Toyo System Co.) located outside of the dry box, respectively. A charging/discharging test is performed in the potential window of 1.5 to 4.2 V under constant current conditions at room temperature.

Figure 2:
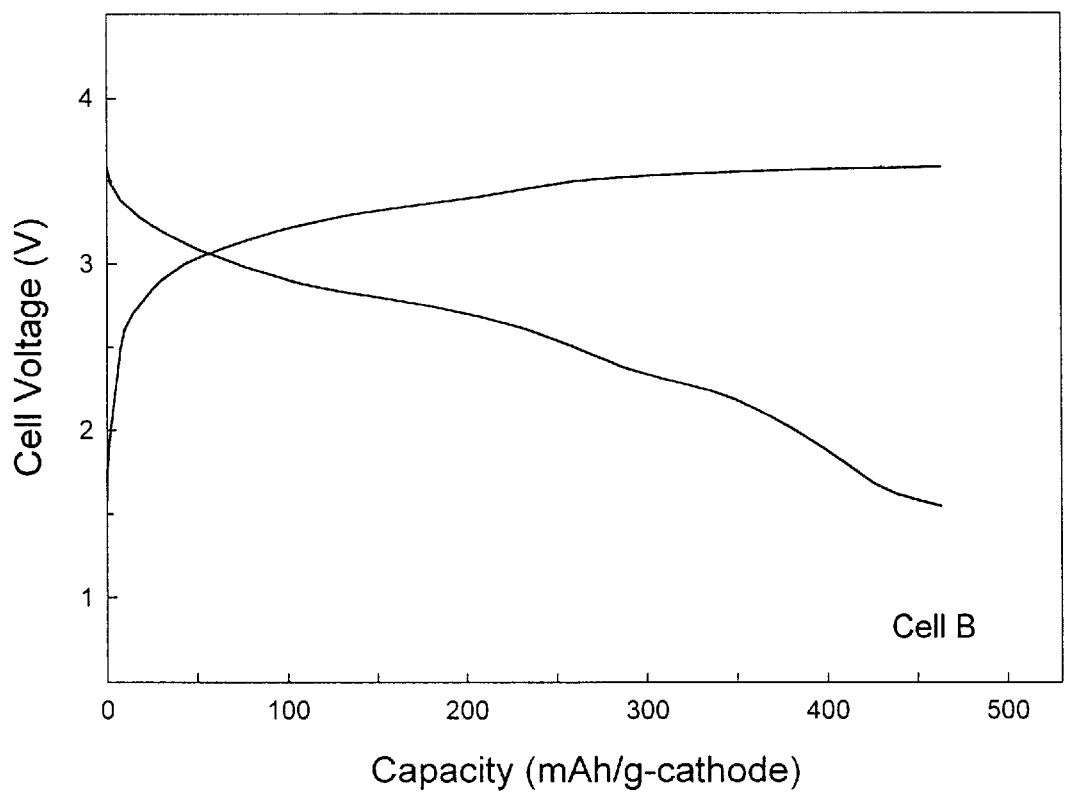
FIG. 2 shows charge and discharge profiles of a cell A containing a cathode including $FeCl_2$/polyaniline composition prepared in Example 3.
Figure 3:
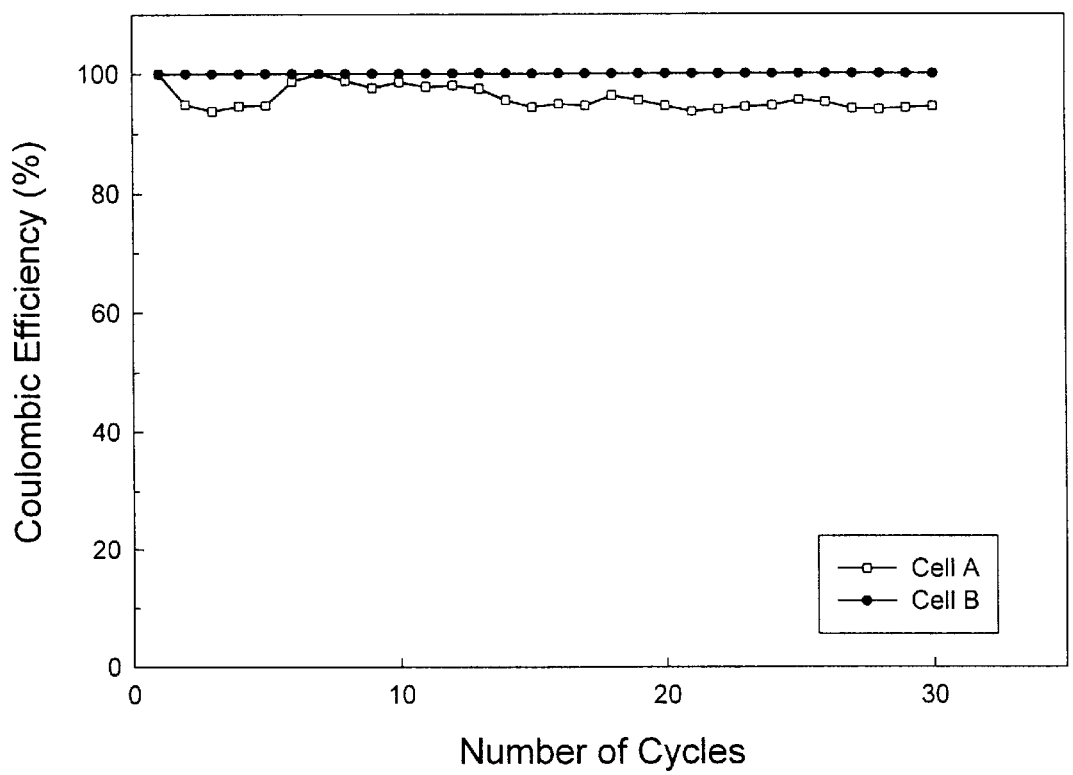
FIG. 3 shows variation of Coulombic efficiency of the cell A and cell B.

FIGS. 1 and 2 show the charging/discharging profiles of the cells A and B which contain the cathode including $FeCl_2$/matrix polymer composition prepared in Examples 2 and 3, respectively. And FIGS. 1 and 2 show similar charging/discharging curves with 2.5 V of average discharging voltage, indicating that poly(vinyl pyrrolidone) and polyaniline used as a matrix polymer stabilize the iron metal species to the similar extent. The charge density of each cell is higher than 400 mAh/g, thus denoting the fact that the iron metal species is effectively used as a cathode active material having oxidation number of 3. Therefore, the corresponding energy density of each cell is beyond 1,000 mWh/g. FIG. 3 shows the charging/discharging efficiency according to the cycle number in case both the cells are charged in 100% of utility efficiency derived from the content of metal species. Through the 30 times of charging/discharging, the both cells maintain above 90% of discharge/charge efficiency.

Figure 4:
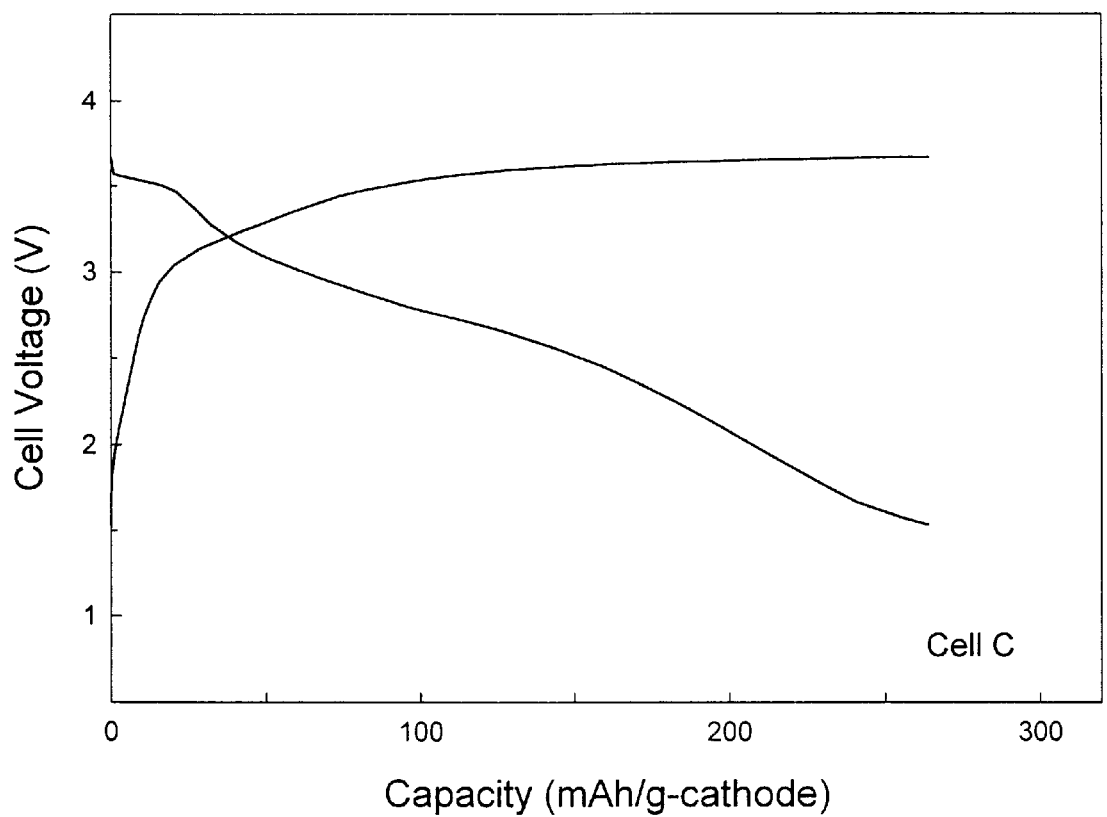
FIG. 4 shows charge and discharge profiles of a cell C containing a cathode including $ZnCl_2$/poly(vinyl pyrrolidone) composition prepared in Example 4.
Figure 5:
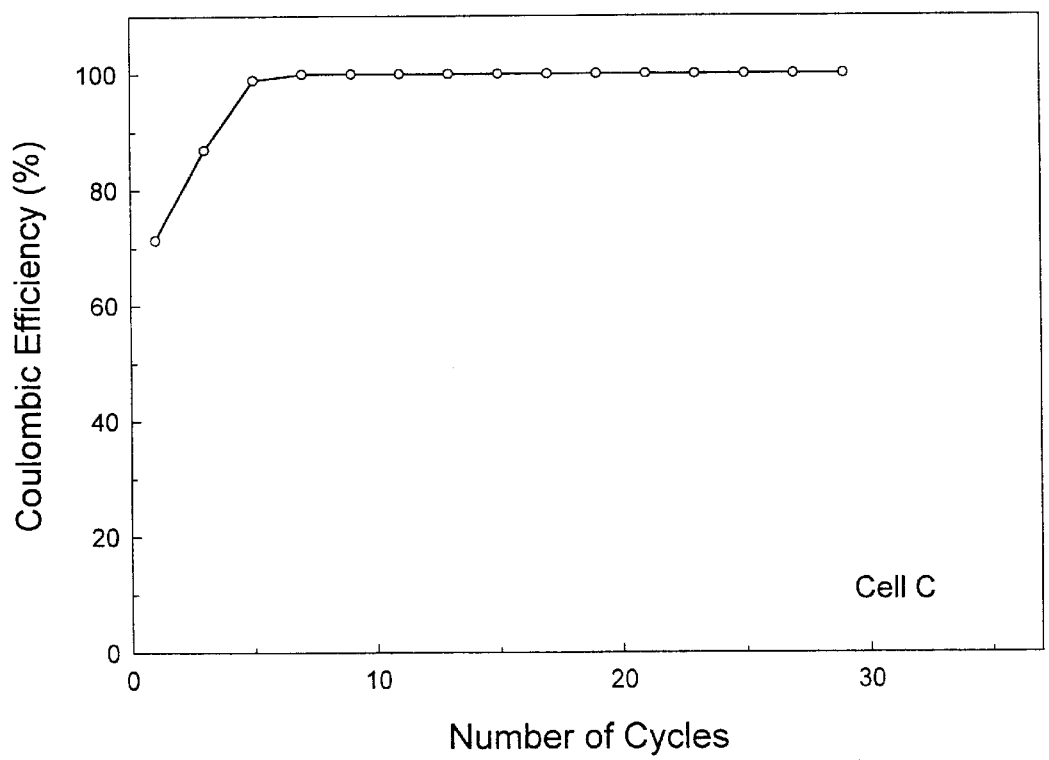
FIG. 5 shows variation of Coulombic efficiency of the cell C.

Furthermore, FIG. 4 shows the charging/discharging profiles of the cell C containing $ZnCl_2$ as a cathode active material, prepared in the Example 4. The average discharging voltage of the cell C is 2.6 V, energy density is 600 mWh/g and discharge capacity is 250 mAh/g, indicating that Zn species operates effectively as a cathode active material having 2 electrons involved in the redox process. FIG. 5 shows the variation in the efficiency of a discharging/charging of the cell C according to cycle number. Almost 100% of efficiency was continuously observed during 30 cycles. High efficiency in the repeated cycles of charge and discharge points to the high reversibility of the electrode.

From the results of FIGS. 1, 2 and 4, the secondary battery containing the cathode of the present invention has a high energy density by effectively using the high capacity of the transition metal as a cathode active material. Moreover, with reference to FIGS. 3 and 5, the secondary polymer battery of the present invention shows good reversibility and high discharging/charging efficiency.

It will be apparent to those skilled in the art that various modifications and variations can be made in the secondary polymer battery comprising a cathode including transition metal/matrix polymer composition of the present invention without departing from the spirit or scope of the invention. Thus, it is intended that the present invention covers the modifications and variations of this invention provided they come within the scope of the appended claims and their equivalents.

What is claimed is:

1. A composite cathode containing a current collector made of an electrically conductive substrate and a composition placed on said current collector, said composition comprising:
    a) at least one of a transition metal salt of the formula $MX_n$, wherein M is a transition metal selected from the group consisting of Fe, Ni, Co, Cr, V, Mo and W, X is chlorine (Cl), and n is an integral number between 1 to 6;
    b) a matrix polymer which has a basic functional group with affinity for the transition metal species, and said group is selected from
       i) the group consisting of halogen, nitrile, carboalkoxy, carbohydroxy, pyrrolidonyl and pyridinyl functional groups;

ii) the group consisting of ether, imine, sulfide and sulfone functional group; and iii) the group consisting of polyaniline, polypyrrole and polythiophene.

2. The composite cathode as claimed in claim 1, wherein the matrix polymer is selected from the group consisting of polyacrylate, poly(acrylic acid), poly(methyl methacrylate), poly(vinyl pyrrolidone), polyacrylonitrile, poly(vinylidene fluoride), their copolymer, and mixtures thereof.

3. The composite cathode as claimed in claim 1, wherein the matrix polymer is selected from the group consisting of polyethylene imine, polyphenylene sulfide, polysulfone resin, their copolymer, and mixtures thereof.

4. A secondary polymer battery which comprises:
   a) a cathode containing a current collector made of an electrically conductive substrate and a composition placed on said current collector, said composition comprising:
   at least one of a transition metal salt of the formula $MX_n$, wherein M is a transition metal selected from the group consisting of Fe, Ni, Co, Cr, V, Mo and W, X is chlorine(Cl), and n is an integral number between 1 to 6;
   a matrix polymer which has a basic functional group with affinity for the transition metal species, and said group is selected from
   (i) the group consisting of halogen, nitrile, carboalkoxy, carbohydroxy, pyrrolidonyl and pyridinyl functional groups;
   (ii) the group consisting of ether, imine, sulfide and sulfone functional group; and
   (iii) the group consisting of polyaniline, polypyrrole and polythiophene;
   b) a polymer electrolyte containing a lithium salt; and
   c) an anode including a material selected from the group consisting of a lithium metal, a lithium alloy and a lithium intercalation material.

5. The secondary polymer battery as claimed in claim 4, wherein the matrix polymer is selected from the group consisting of polyacrylate, poly(acrylic acid), poly(methyl methacrylate), poly(vinyl pyrrolidone), polyacrylonitrile, poly(vinylidene fluoride), their copolymer, and mixtures thereof.

6. The secondary polymer battery as claimed in claim 4, wherein the matrix polymer is selected from the group consisting of polyethylene imine, polyphenylene sulfide, polysulfone resin, their copolymer, and mixtures thereof.

7. The secondary polymer battery as claimed in claim 4, wherein the electrically conductive substrate is a material selected among Cu, Al, Ni, stainless steel and graphite.

8. The secondary polymer battery as claimed in claim 4, wherein the polymer electrolyte contains a polymer and a lithium salt of the formula LiY, wherein Y is an anion.

9. The secondary polymer battery as claimed in claim 4, wherein the lithium intercalation material is selected from the group consisting of carbon and graphite.

10. The secondary polymer battery as claimed in claim 4, wherein the content of the matrix polymer is in the range of 5 to 60 weight % of the total constituents in the cathode.

11. The composite cathode according to claim 1, wherein the content of the matrix polymer is in the range of 5 to 60 weight % of the total constituents in the cathode.

12. The secondary battery as claimed in claim 4, wherein the cathode is prepared in following steps:
   a) in the first step, a matrix polymer selected from the group consisting of poly(vinyl pyrrolidone), and polyaniline is mixed with a binder consisting of poly(vinylidene fluoride) dissolved in aprotic solvent consisting of N-methyl-2-pyrrolidinone to form a solution;
   b) in the second step, transition metal salt selected from the group consisting of iron chloride($FeCl_2$), nickel chloride ($NiCl_2$), cobalt chloride ($CoCl_2$), chromium chloride ($CrCl_3$) and vanadium chloride ($VCl_3$) is added to the solution of the first step;
   c) in the third step, a conductive material consisting of acetylene black is added to the solution of the second step and a mixture is obtained;
   d) in the fourth step, the mixture obtained in the third step is applied on a current collector consisting of copper foil and the coated slip is dried under vacuum and then pressed.

* * * * *